United States Patent Office 3,323,977
Patented June 6, 1967

3,323,977
WOOD GRAIN FINISH DECORATIVE LAMINATE
AND METHOD FOR ITS PRODUCTION
William Charles Hood, Varnville, S.C., assignor to Westinghouse Electric Corporation, Pittsburgh, Pa., a corporation of Pennsylvania
No Drawing. Filed Feb. 24, 1964, Ser. No. 347,010
7 Claims. (Cl. 161—146)

The present invention relates to a novel, natural appearing, wood grain finish decorative laminate. The novel laminate is characterized by its appearance which closely resembles that of natural, oil rubbed wood. The invention includes both the method of preparation of the novel decorative laminate and the laminate itself.

In the conventional commercial production of decorative laminates, the exposed decorative surfaces of the articles have been characterized by exceptional smoothness presenting finishes known in the trade as satin, furniture, or gloss. Recently, there has been available a so-called textured finish laminate in which the fibrous formation of a parting, or release, sheet is transferred to the laminate surface during consolidation thereof. This textured finish laminate has had a hazy, milky appearance which has not been entirely desirable. Attempts have been made to overcome this undesirable feature by mildly abrading the decorative surface. This treatment, however, has not proved satisfactory. Moreover, all of the previous wood grain laminates have presented an artificial appearance which has seriously affected their commercial acceptance. Accordingly, these articles have not been accepted by many branches of the industry up to the present time.

It is a primary object of the present invention to provide a natural appearing wood grain finish decorative laminate.

A further object of the invention resides in the provision of a wood grain decorative laminate characterized by its appearance and feel of natural oil-rubbed wood.

Other objects of the invention will become apparent from the following detailed description thereof.

In general, the invention stems from the discovery that in a certain class of decorative laminates, namely some so-called textured finishes, a surface treatment renders the laminates greatly improved in both appearance and feel.

In producing textured decorative laminates, it is common practice to place a parting, or release, sheet between the top lamina and the press plate. Release sheets ordinarily employed are parchmentized cellulose sheets or other paper sheets characterized by a definite fiber pattern. During consolidation of the laminae under heat and pressure, the fiber configuration of the release sheet is transferred to the decorative surface of the consolidated article. In some instances, there may even be some actual transfer of fibers. The finished article presents a hazy appearance which, for many uses, is a distinct detriment. This is especially true in the case of decorative laminates having a wood grain pattern.

Experimentation has shown that the hazy appearance is due, in large part, to micro-fractures in the resin present in the surface sheet of the laminate. Inasmuch as the resin present in the surface and decorative sheets of the laminate is usually a melamine-formaldehyde resin, the thermoset resin is relatively brittle. Accordingly, during the consolidation treatment, this surface resin becomes micro-fractured thus reducing its transparency.

It has been noted that the fracturing of the melamine-formaldehyde surface resin exposes at least some of the fibers contained in the surface laminae. The unexpected discovery was made that these exposed fibers may be actually wetted by the application thereto of a suitable oil or wax and, in the process, become more transparent or less hazy. One of the critical features of the invention, therefore, resides in rubbing the laminate surface with a desired oil or wax to the extent that the surface fibers become thoroughly wetted. Thereafter, excess oil is removed by wiping or other suitable means. The oil rubbed decorative surface then appears to be that of a natural oil rubbed wood. Moreover, the oil rubbed surface presents to the touch the feel of natural wood. There is no oily feeling inasmuch as the treating materials have been absorbed by the exposed surface fibers. The treatment also affords a relatively permanent finish which requires none or very little additional treatment during use. The finish can be renewed by an additional application of oil or wax.

The oils which may be employed in practicing the invention are those which are commonly employed in the furniture industry. The main feature of the oil must be a viscosity which is low enough that the oil can easily wet the surface fibers. Both in the case of oils and waxes, the materials may be employed in conjunction with various solvents although these may be undesirable in some instances because of the odor or fire hazards involved. One particular oil which may be employed is a cutting and grinding oil which is water soluble. Such an oil is available commercially as "Key-Cut Soluble Cutting and Grinding Oil" manufactured by the Keystone Lubricating Company, Philadelphia, Pa. This particular oil is used in conjunction with water as solvent.

In carrying out the invention, the preparation of the decorative laminate follows procedures conventionally employed. The laminate may be prepared by combining a plurality of body or core sheets of any conventional laminate base material now in use or any particular laminate base such as an extensible fibrous material impregnated and bonded together with from about 28% to about 100% of its weight of a thermosettable resin composed of a phenol-formaldehyde, phenol-cresol or like resin, a decorative layer applied thereto, the decorative layer comprising a sheet of any desired base material with a predetermined pattern, and containing from about 35% to about 135% of its weight of a modified melamine-formaldehyde resin. The decorative surface layer may comprise a sheet of alpha-cellulose paper, thin cotton fabric, silk, glass fabric, asbestos paper or the like fibrous sheet material with a design imprinted thereon. In the present invention, the desired design will ordinarily be a wood grain imprint. The thickness of the sheets employed will usually be of the order of about 5 to 12 mils. Ordinarily, a resin impregnated protective overlay sheet is employed over the design sheets to provide improved abrasion resistance and good surface appearance. Suitable materials for the overlay sheets include rayon, glass fabric and alpha-cellulose paper. The overlay sheets will ordinarily be of a thickness of the order of from about 1 mil to 6 mils.

The various component laminae are arranged in a stack with the decorative and overlay sheets being uppermost. Over the stack there is positioned a conventional release sheet which is ordinarily an alpha-cellulose treated paper material. The stack is then compressed under heat and pressure to the desired final density and, subsequent to removal from the press, the release sheet is stripped from the surface leaving the above-described hazy appearance in the surface of the finished article.

In a specific embodiment of the invention, a plurality of core sheets comprising kraft paper sheets containing approximately 50% of their weight of any of the conventional laminate resins are super-imposed on each other and topped with a decorative sheet impregnated with a clear melamine-formaldehyde resin and an overlay sheet of alpha-cellulose also impregnated with a melamine-formaldehyde resin. The stack is placed in a flat bed press with a release sheet positioned over the top lamina. The stack is then molded at a pressure of from about 500 to 1500 pounds per square inch at a temperature of from about 225° to 335° F. for a period of time of about one-half to two hours, then cooled and withdrawn from the press.

Thereafter, there is applied to the decorative surface of the laminate a water emulsion of a cutting oil, such as that referred to above. The emulsion is applied to the surface which is then rubbed until the fibers exposed in the surface of the laminate have been thoroughly wetted. The laminate is then rubbed dry with a dry cloth until excess oil and water have been removed. The oil application imparts to the finished product the feel and appearance of oil finished wood, plus the advantage that it does not show fingerprints, smears, scuff marks and scratches as readily as other finishes. The laminate so obtained also has a very low Gardner Gloss meter reading (0–4) with almost no glare. Over a considerable period of time and use, it has not been necessary to further treat the decorative surface of the laminate.

From the foregoing, it will be appreciated that applicant has provided to those skilled in the art a novel method of preparing a wood grain finish decorative laminate which is characterized by the appearance and feel of natural oil finished wood. The procedure is simple and the results are long lasting. It will be appreciated that the invention represents a decided and distinct advance in the art of decorative laminates.

I claim as my invention:

1. A method of preparing a natural appearing wood grain high pressure decorative laminate which comprises consolidating to high density and curing to thermoset state under heat and pressure a stack of resin treated laminae including a fibrous overlay sheet and a fibrous wood grain print sheet both of which are impregnated with a melamine-formaldehyde resin, the overlay sheet contacting a fibrous parting sheet during the consolidation treatment, the overlay sheet having a micro-fractured thermoset resin surface exposing surface fibers therein, and thereafter rubbing the decorative surface with an oil until the exposed surface fibers are thoroughly wetted, and then removing the excess oil.

2. A method of preparing a natural appearing wood grain high pressure decorative laminate which comprises consolidating to high density and curing to thermoset state under heat and pressure a stack of resin treated laminae including a fibrous overlay sheet and a fibrous wood grain print sheet both of which are impregnated with a melamine-formaldehyde resin, the overlay sheet contacting a fibrous parting sheet during the consolidation treatment, the overlay sheet having a micro-fractured thermoset resin surface exposing surface fibers therein, thereafter rubbing the decorative surface with an oil-water emulsion until the exposed surface fibers are thoroughly wetted, and then removing the excess emulsion.

3. A method of improving the surface appearance of a high pressure decorative laminate having laminae including melamine-formaldehyde resin impregnated wood grain fibrous print and fibrous overlay sheets, the resin being cured to a thermoset state and the overlay sheet having a micro-fractured surface exposing surface fibers therein, comprising the steps of rubbing said surface with oil to thoroughly wet the exposed fibers and removing excess oil.

4. The method of claim 3 wherein said surface is rubbed with a cutting oil-water emulsion.

5. A high pressure decorative laminate comprising, in combination, thermoset resin impregnated fibrous laminae consolidated into a unitary structure, the laminae including melamine-formaldehyde impregnated wood grain fibrous print and fibrous overlay sheets, the overlay sheet having a micro-fractured resinous surface that exposes surface fibers, the surface fibers being thoroughly wetted with oil to provide an attractive haze-free appearance.

6. The laminate of claim 5 in which said oil is a cutting oil and said surface has a textured finish.

7. The laminate of claim 6 in which the print sheet is a sheet of alpha-cellulose paper about 5 to 12 mils in thickness and contains from about 35% to about 135% of resin, based on the weight of paper.

References Cited

UNITED STATES PATENTS

| | | | |
|---|---|---|---|
| 1,942,146 | 1/1934 | Kollek et al. | 117—153 X |
| 1,997,358 | 4/1935 | Cochrane | 156—217 X |
| 2,066,296 | 12/1936 | Lyons | 117—149 |
| 2,565,251 | 8/1951 | Malmstrom | 161—56 |
| 2,786,008 | 3/1957 | Herschler | 161—261 X |

ALEXANDER WYMAN, *Primary Examiner.*

W. A. POWELL, *Assistant Examiner.*